Figure 1A:
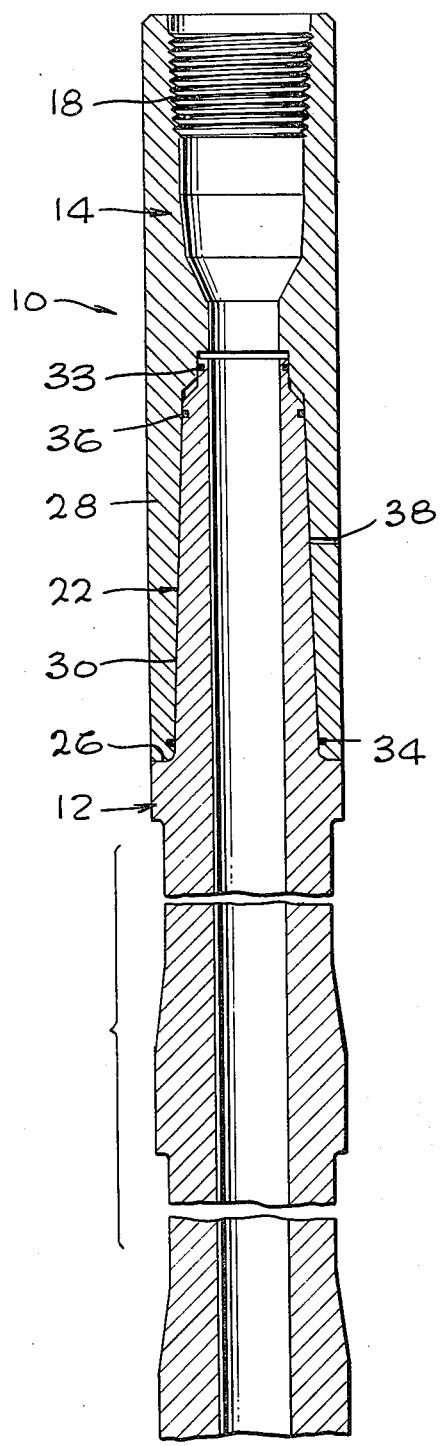

United States Patent
Cruickshank et al.

[11] 3,923,324
[45] Dec. 2, 1975

[54] DRILL COLLAR WITH THREAD CONNECTIONS

[75] Inventors: James R. Cruickshank, Ras Beirut, Lebanon; Rainer Jürgens, Westercelle, GDR, Germany

[73] Assignee: Christensen Diamond Products Company, Salt Lake City, Utah

[22] Filed: Jan. 14, 1974

[21] Appl. No.: 433,142

[30] Foreign Application Priority Data
Mar. 20, 1973 Germany.............................. 2313664

[52] U.S. Cl. ................. 285/16; 285/18; 285/332.3; 285/381; 308/4 A; 285/333
[51] Int. Cl.² ......................................... F16L 21/02
[58] Field of Search ......... 285/381, 334, 16, 15, 17, 285/333, 18, 332.3; 308/4 A

[56] References Cited
UNITED STATES PATENTS

| | | | |
|---|---|---|---|
| 1,326,259 | 12/1919 | Gunn et al. | 308/4 A |
| 1,619,728 | 3/1927 | Hopkins | 285/16 X |
| 2,232,135 | 2/1941 | Pate | 285/16 |
| 2,546,295 | 3/1951 | Boice | 308/4 A |
| 2,671,949 | 3/1954 | Welton | 285/334 X |
| 2,992,479 | 7/1961 | Musser et al. | 285/381 X |
| 3,063,143 | 11/1962 | Bodine | 285/381 X |
| 3,114,566 | 12/1963 | Coberly et al. | 285/381 X |
| 3,326,581 | 6/1967 | Wong | 285/381 X |
| 3,754,609 | 8/1973 | Garrett | 285/333 X |

Primary Examiner—Thomas F. Callaghan
Attorney, Agent, or Firm—Bernard Kriegel

[57] ABSTRACT

Drill collar for a rotary drill string, including a threadless drill collar body, parts or connections, such as a sub having pin threads or a sub having box threads, being frictionally mounted by means of a shrink-fit on opposite ends of the body, the combination of parts enabling drill collars to remain at a preselected, constant length by replacing a worn thread connection or sub with a new one, all of such connections or subs having the same length.

6 Claims, 4 Drawing Figures

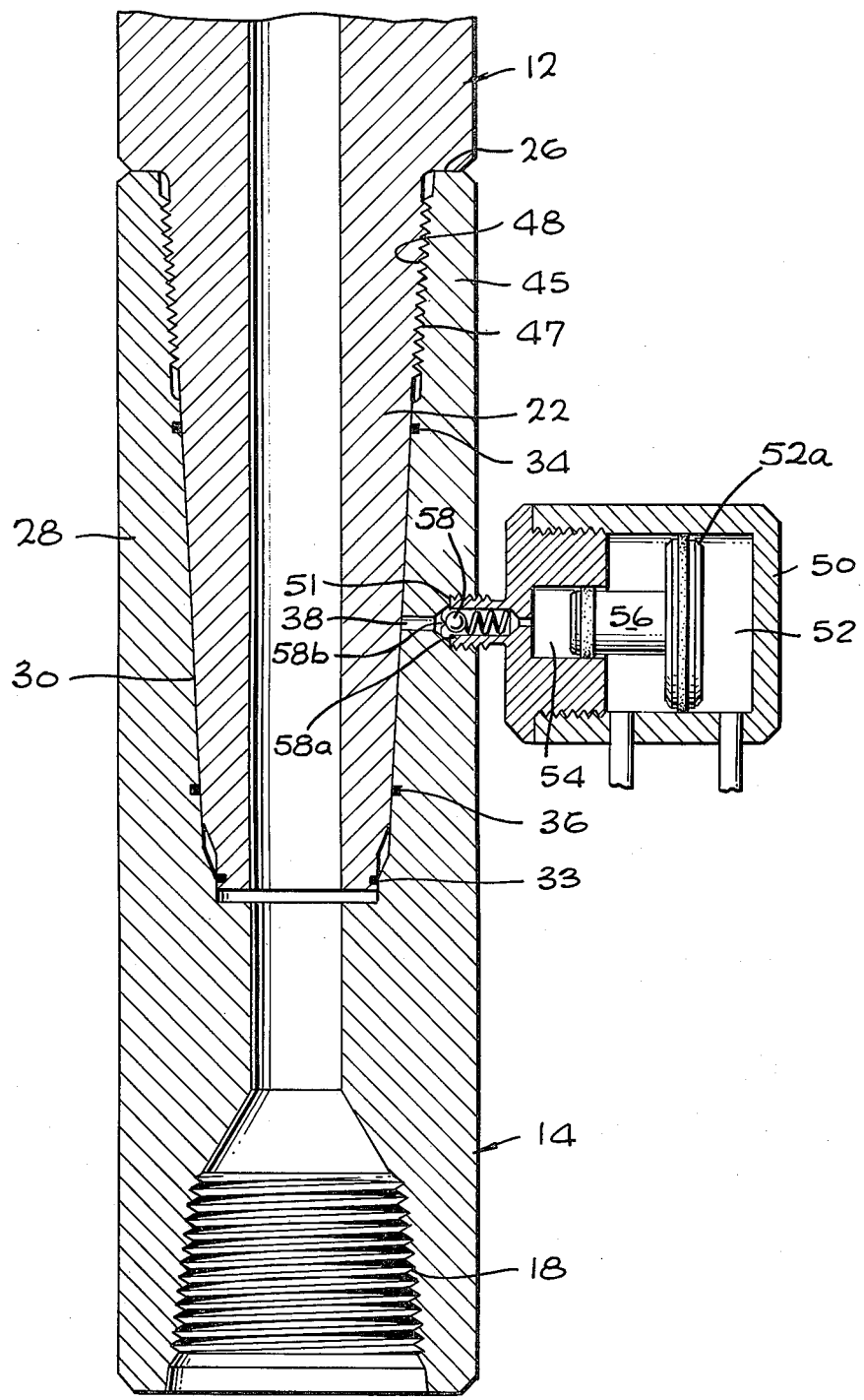

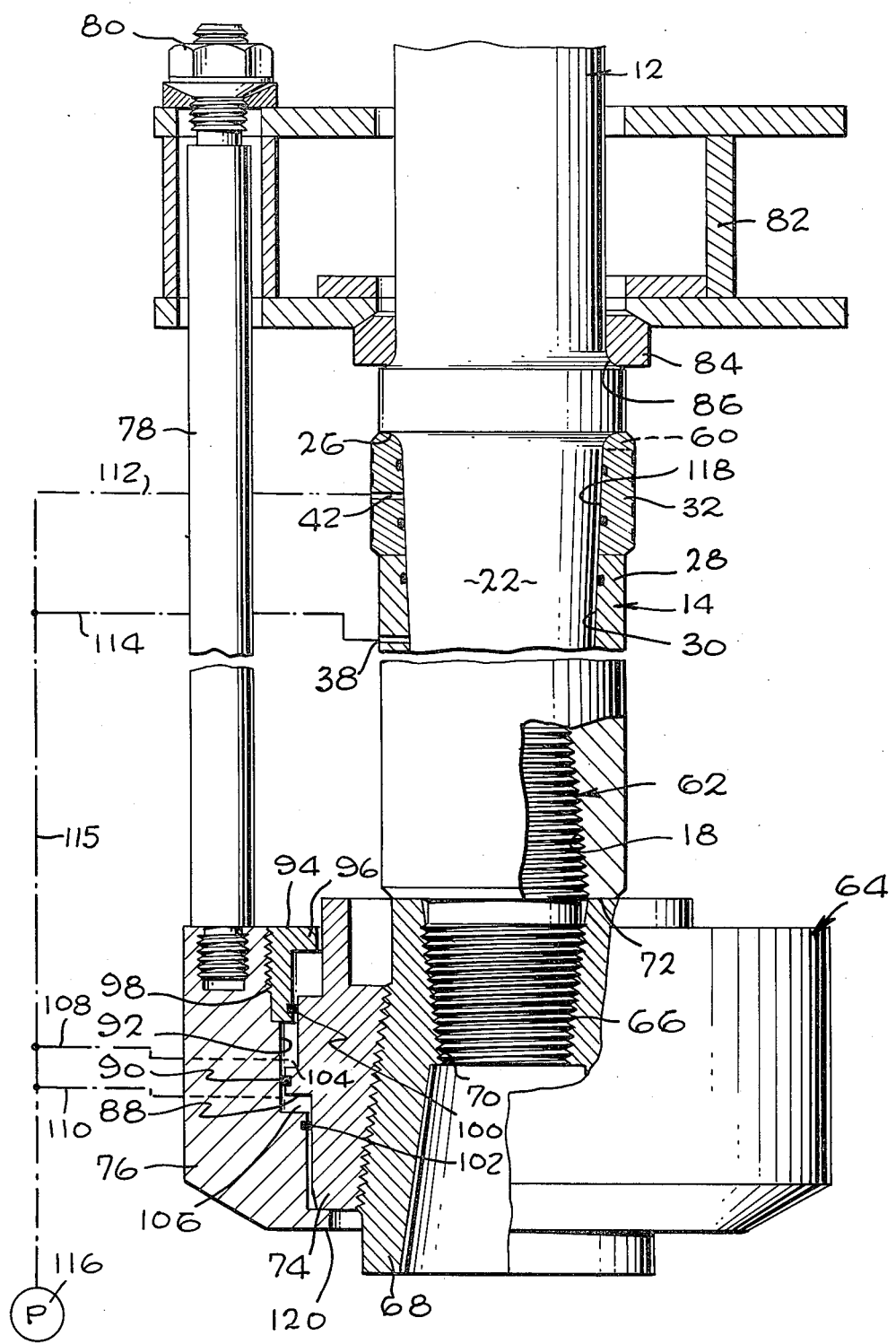

DRILL COLLAR WITH THREAD CONNECTIONS

The present invention relates to drill collars, and more particularly to drill collars which can be maintained in proper condition and at a substantially constant length.

In a rotary drilling string for drilling bore holes, drill collars are generally used above the drilling tool or bit for imposing the desired drilling weight on the tool. Drill collars in a drilling string should each have the same standard length in order that the total length of collars will be known with accuracy.

Drill collars are provided with threaded connections, such as tapered box and pin threads, the pin and box of adjacent collars being threadedly secured to each other to provide safe transmission of drilling weight and torque to the drill bit and for sealing against high fluid pressures. Such threaded connections are subject to heavy strains and wear, requiring reconditioning from time to time, which involves removal of a drill collar from the drill string and its transporting to special workshops where reworking of the thread area is performed, with resultant decrease in the overall length of the collar.

In order to resist and decrease damage to drill collars, they are usually manufactured from heat-treated, high-tensile steel. It is also known to form only the ends of the drill collars from heat-treated material or to weld heat-treated end pieces to non-heat-treated body material.

Further, the threads employed as connections on drill collars must be manufactured with special care, handled carefully and require regular maintenance work. In addition, constant control is required to recognize damaged threads and cracks to avoid further damage to the threads. As a result of reworking of the threaded area, the drill collar is shortened in length, as noted above. When its length has been shortened considerably as a result of repeated reworking, it must be restored to its original length or scrapped. A known restoration procedure involves cutting off a threaded end of the collar and welding a required length of an additional drill collar stub to the remaining drill collar portion. The resulting reworking of the thread area, as well as the welded stubbing procedure, requires specialized equipment, not necessarily available at the drill site. Elongation of the drill collar by screwing on a short piece of drill collar is generally not acceptable, since an additional thread connection is created which constitutes a further weak point in the drill string and requires potential additional maintenance work, as is the case of all threaded connections in the drill string.

To decrease the damage to the threads of a drill collar, it is also known to fit the drill collars with pins only and to employ as connecting elements intermediate pieces made of high-tensile material with double-sided box threads (U.S. Pat. No. 3,572,771). However, resulting threaded pin damage occurs, requiring costly repairs.

For drilling operations generally, the drill collar type having threaded connections on both ends is advantageous because of each round tripping in and out of the bore hole. The chief objective of the present invention is to provide such threaded connections which are durable, yet can be readily replaced when worn, while maintaining the overall length of the drill collar substantially constant.

The above object is achieved, according to the invention, by providing a drill collar with at least one interchangeable threaded connection member or sub which is mounted by a shrink-fit on one or both ends of the main body of the drill collar. Thus, the drill collar body can be thread free, the thread bearing connections or parts being designed for frictional engagement with the ends of the drill collar body by a fluid or hydraulic pressure applied shrink-fit to permit facile mounting and demounting of the thread bearing connection member when worn from the main body, and for maintaining the overall drill collar at a substantially constant length. For increasing power transmission through the shrink-fitted joint, friction increasing media can be applied between the contacting or matching faces of the shrink-fit connection with the main drill collar body.

The shrink-fit of the threaded connection member or sub with the drill collar body is achieved by providing matching tapered or conical surfaces between the threaded member and the drill collar body. During the mounting operation, a box portion of the replaceable threaded connection member is elastically widened or expanded by fluid or hydraulic pressure, while simultaneously applying an axial force to the body and member, until the two parts shoulder against each other.

The present invention structure and its various advantages will be made more clearly apparent from a consideration of the preferred embodiments of the invention shown in the accompanying drawings and forming part of the present specification. These embodiments are described in detail below for purposes of illustrating the general principles of the invention, but it is to be understood that such detailed description is not to be taken as limitative.

Figure 1B:
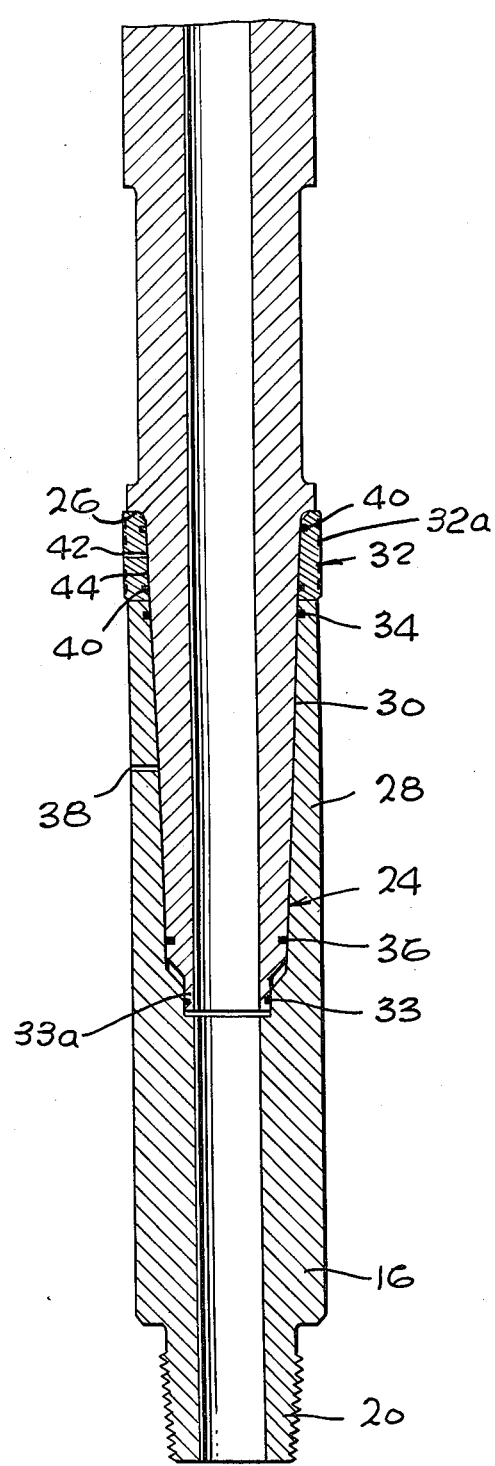

Referring to the drawings:

FIGS. 1a and 1b together constitute a sectional elevation of a drill collar with exchangeable threaded connections or subs, FIG. 1b being the lower continuation of FIG. 1a, and providing the pin connection (FIG. 1b) and box connection (FIG. 1a);

FIG. 2 is a sectional elevation of a modified form of shrink-fit interconnection between a threaded connection member or sub and the tapered pin end portion of a drill collar body, and showing equipment for hydraulically mounting or demounting the sub; and FIG. 3 illustrates another form of equipment for hydraulically mounting a threaded connection member or sub on the drill collar body, or for demounting the sub.

Referring to FIGS. 1a and 1b of the drawings, there is shown a drill collar 10 comprised of an elongate main drill collar body 12 of a desired length. Both ends of the drill collar body are provided with threaded connections or subs 14 and and 16, respectively, sub 14 carrying a threaded box 18 and sub 16 carrying a threaded pin 20.

To connect the drill collar body 12 with subs 14 and 16 to permit replacement of the latter, the drill collar body 10 is provided with conical or tapered members or pins 22 and 24 at opposite ends of the drill collar body, with an external shoulder 26 adjacent the connection of the base of each of such tapered pins with the drill collar body.

The corresponding ends of the subs 14 and 16, which are mounted on the conically shaped pins 22 and 24, respectively, of the drill collar body 10, are box shaped as shown at 28 and have a conical inner area or surface which matches or corresponds to the conical configuration of the exterior surface of the drill collar pins 22 and 24, as indicated at 30.

The frictional connection between the matching conical surfaces 30 between conical pins 22 and 24 of drill collar body 10, and the corresponding subs 14 and 16, respectively, is accomplished as by the application of pressure fluid between the adjacent contacting surfaces 30, while simultaneously applying an axial force, as by fluid or hydraulic pressure, to push or force the box shaped portion 28 of each sub 14 or 16 onto its companion conical pin 22 or 24 of the drill collar body, until such box shaped member abuts the shoulder 26 adjacent the connection of the conical pins 22 or 24 with the main drill collar body 12.

As an additional optional feature, the application of the above-noted thread bearing subs 14 and 16 to the thread free drill collar member 12 facilitates the additional thread free insertion of a wear ring 32 around one or both of the conical pins 24 and 22 of the drill collar body, this ring being disposed between the outer end of the box shaped portion 28 of subs 14 or 16 and the adjacent shoulder 26 of the drill collar body 12. The wear sleeve 32 is mounted by the same pressure applied or hydraulic shrink-fit as each member 28, and a box shaped member 28 and the wear sleeve 32 can be mounted on the pin 22 or 24 substantially simultaneously to provide a shrink-fit of the member 28 on such pin. The wear sleeve 32 can be formed with a hard-faced metal external surface, having oriented wear resistant tungsten carbide inserts 32a in a metal bond or matrix. The high internal pressure occurring in the operation of the drill collars as part of a drill string is sealed by a sealing ring 33 provided at the reduced base portion 33a of each of the tapered pins 22 and 24, and contacting the internal surface of each sub 14 or 16 adjacent the inner end of the box portion 28 thereof.

For purposes of applying fluid pressure to the space between the matching conical surfaces 30; i.e., between the conical pins 22 and 24 of the drill collar body and the adjacent interior conical surfaces of the box shaped portions 28 of the subs, a peripheral sealing ring 34 is provided in the interior surface of each member 28 adjacent the outer end thereof, a peripheral sealing ring 36 being provided in the external surface of each of the conical pins 22 and 24 adjacent the smaller diameter ends thereof. A port 38 is provided in the box shaped portions 28 of each sub 14 and 16 for introduction of gaseous or hydraulic fluid pressure into the space 30, for laterally expanding the member 28 during shrink-fitting thereof onto the corresponding pin 22 or 24, as described in detail below. Similarly, the wear ring 32, if supplied, is provided with spaced peripheral seals 40 on its internal surface adjacent its top and bottom, a port 42 being disposed in the wear ring between the seals 40 for introduction of fluid under pressure into the area between the contacting surfaces 44 for the purpose of expanding the wear ring 32 during the shrink-fitting operation. It is noted that wear ring 32 also has an internal surface having a slight taper to match the tapered conical exterior surface of the pin 22 or 24.

The angle of taper of the conical or tapered pins 22 and 24, and of the corresponding interior surfaces of the box shaped portions 28 of subs 14 and 16, and the interior surface of wear sleeve 32 can range from about ¼° to 4°, for example, about ½°.

Referring now to FIG. 2 of the drawings, there is shown a modified form of connection between the drill collar body 12 and the sub 14 (or 16), in which the conical pin 22 (or 24) has an extended portion 45 containing an external thread 47 adjacent the inner shoulder 26 of the body 12. The box portion 28 of the sub 14 (or 16) also has an extended portion to provide a matching internal thread 48 adjacent the end of sub 28. In this embodiment, fluid pressure is introduced via port 38 into the area 30 between the tapered matching faces of the tapered pin 22 (or 24) and the box portion 28 of the sub, such area being sealed by the spaced seals 34 and 36. Such pressure can be applied by means of pressure equipment 50 in the form of a pressure multiplier threaded at 51 into the ported region of the box 28. A gas pressure is applied from a suitable source to a large cylinder 52 for action upon a large piston 52a connected to a small piston 56 shiftable in a small cylinder 54 containing a suitable hydraulic fluid, the pressure of the hydraulic fluid being multiplied by the ratio of the areas of the large and small pistons. The hydraulic fluid passes through the port 38 into the area 30. Before threadedly attaching the equipment to the box 28, a check valve 58 engages a companion seat 58a to trap the hydraulic fluid in the cylinder 54. Upon threading the equipment in the box 28, a suitable projection 58b in the box engages the valve 28 and unseats it.

As fluid pressure is thus applied via port 38 to the space 30 between the box shaped portion 28 of sub 14 and the conical pin 22, the box portion 28 is expanded and the sub 14 can be further threaded onto the threads 47 of the pin 22 of the drill collar body until it engages the shoulder 26 of the drill collar body 12. When the pressure is relieved and the equipment 50 unscrewed from the member 28, the box portion 28 shrinks onto the pin 22, tightly securing the sub 14 to the drill collar body 12.

In FIG. 3, mounting equipment is disclosed for mounting the subs 14 or 16 by a shrink-fit onto the drill collar body 12. In FIG. 3, the sub 14 of FIG. 1 is disclosed, having the box thread 18 at its outer end, together with a wear collar 32 to be secured on the main drill collar body 12. For this purpose, the tapered parts 22, 28 and 32 are first cleaned and can be covered with a friction increasing material, such as silicon carbide or tungsten carbide, in the form of a paste comprising a mixture of a light oil containing 10 percent by volume of 200 mesh carbide. It will be understood that application of the friction increasing material is optional. The wear sleeve 32 and then the box portion 28 of the sub 14 are pushed on the tapered pin 22 of the drill collar body 12 and both engaged with the external pin surface, at which time there is a space indicated at 60 between the wear sleeve and the shoulder 26 of the drill collar body 12.

A double pin 62 is screwed into the box thread 18 of the sub 14 and a hydraulic mounting tool 64 is connected to the lower pin 66 of the double pin 62. The mounting tool 64 has a composite piston 68, 74 containing internal conical threads 70 at its upper end which are threadedly connected to the lower pin 66 for mounting the piston thereon, the upper end of the piston being in contact with the lower end 72 of the box portion 18, 28 of the sub 14. The external portion 74 of the composite piston has a cylinder 76 mounted thereon which is operatively connected to the drill collar body 12 through a plurality of axially disposed, circumferentially spaced parallel tie rods 78, only one of which is shown in FIG. 3. These rods are connected at their upper ends by a nut 80 yolk 82 positioned against a two-piece or split ring 84 bearing against a shoulder 86 of the drill collar body 12. The piston 68, 74 is movable axially within the cylinder 76. Thus, the piston portion 74 carries a peripheral flange 88 having a groove containing a seal ring 90, such seal ring being in slidable engagement with the interior surface 92 of the cylinder 76. A cylindrical member 94 having an internal peripheral flange 96 is threadably connected at 98 with an upper portion of the cylinder 76, the lower end of the member 94 carrying an internal seal 100 for slidable engagement with an upper exterior surface of the piston 74. The cylinder 76 is also provided with a seal ring 102 below the flange 88 for slidable sealing engagement with the adjacent exterior surface of the member 74.

The above described arrangement provides an upper pressure chamber 104 and a lower pressure chamber 106 between the movable pistons 74, 68 and the cylinder 76. In the use of the hydraulic mechanism 64 for shrink-fitting the sub 14 and the wear sleeve 32 onto the tapered pin 22 of drill collar body 12, pressure hose lines 108 and 110 are connected, respectively, via suitable connections or ports (not shown) to the upper and lower pressure chambers 104 and 106, respectively. Pressure hose lines 112 and 114 are connected, respectively, to ports 42 and 38 in the wear sleeve 32 and sub 14. All of these hoses are connected via line 115 to a source of hydraulic pressure 116, such as a hydraulic pump unit of a conventional type. Pressure is applied via hose line 110 to the pressure space or chamber 106, and simultaneously via hose lines 112 and 114 to the space 30 at the conical contacting surfaces of members 22 and 28, and to the space 118 between the conical contacting surfaces of the members 32 and 22, respectively, the sealing rings 34 and 36 (see FIG. 1) preventing escape of the hydraulic fluid from the interior space 30, and the sealing rings 40 (see FIG. 1) preventing escape of fluid from the space 118.

The application of pressure fluid into the space 30 expands the interiorly tapered box portion 28 of the sub 14 and also expands the wear sleeve 32. Simultaneously, the pressure fluid introduced into the chamber 106 causes axial movement upward of the connected piston 74, 68, forcing the sub 14 and the wear sleeve 32 upwardly along the tapered pin 22 until the upper end of the wear sleeve 32 abuts the shoulder 26 of the drill collar body 12. When the fluid pressure is relieved, the box portion 28 of sub 14 and the wear sleeve 32 both contract into powerful shrink-fitted contact with the tapered pin 22 of the drill collar body 12. After the hydraulic pressure has been released, a large hoop stress remained in the members 22 and 32, which can be, for example, about 7,000 p.s.i. The length of a tapered end pin, such as 22, can be about 14 inches for a 6-½ inch drill collar body 12.

The hydraulic mounting tool 64 can then be removed by unscrewing the nuts 80 from the tie rods 78, unscrewing the piston 68, 74 from the pin 66, and removing the double pin 62 from the box 18.

It will be understood that, if desired, the wear sleeve 32 can be omited in the embodiment of FIG. 3, in which case only the sub 14 is expanded and shrink-fitted around the pin 22, with the end of the box portion 28 of the sub 14 forced into contact with the shoulder 26 of the drill collar body 12. It will be understood that when a wear sleeve is employed, the pin, e.g., 24 in FIG. 1, on which members 28 and 32 are mounted is lengthened to accommodate both the box portion 28 of the sub and the wear sleeve.

It will be understood that the sub 16 shown in FIG. 1b and containing the pin thread connection 20 can similarly be shrink-fitted, together with a wear sleeve 32, if desired, upon the tapered 24 at the other end of the drill collar body by the hydraulic pressure mounting system 64 shown in FIG. 3, but the double pin 62 is omitted and the piston 68 threadably engaged at 70 on the threaded pin 20 of the sub 16.

The subs 14 and 16, which are thus shrink-fitted onto the tapered pins 22 and 24 of the drill collar body 12, will remain fixed on the drill collar body member, being capable of withstanding torques of about 42,000 to about 540,000 ft. lbs., depending on the diameter and length of the box portion 28 of the subs shrink-fitted onto the tapered pins 22 and 24.

For demounting each of the shrink-fitted subs 14 and 16, and also the wear sleeve or sleeves 32, when employed, after any of these parts have become worn, the same hydraulic equipment described above and illustrated in FIG. 3 can be employed. For this purpose, and referring again to FIG. 3, the double pin 62 is again screwed into the box thread 18 of the sub 14, and the composite member or piston 68, 74 threaded onto the lower pin 66, the supporting yolk 82, tie rods 78, ring 74, and members 76 and 94 assembled. Pressure is then applied through pressure hose 112 to the space 30 between the members 28 and 22, and via the hose 114 to the space 118 between members 32 and 22, causing the box portion 28 of sub 14 and wear sleeve 32 to expand and move downwardly free from contact with the conical surface of the pin 22. The piston 68, 74 is moved downwardly by the sub 14 to the extent limited by engagement of the flange 88 with the cylinder 76. If desired, fluid pressure can also be introduced via hose line 108 into the upper chamber 104, causing the piston 74, 68 to move downwardly and assume its lowermost position against the cylinder 76. Such introduction of fluid pressure into the chamber 104 may not be required, since the fluid pressure in the sleeve 32 and box 28 acts over the differential areas in the sleeve 32 and box 28 between their respective seal rings 40 and 34, 36 to force the sleeve 32 and sub 14 downwardly toward the small end of the tapered pin 22, the cylinder 76 serving as a stop to prevent the sub 14 and the wear sleeve 32 from suddenly blowing off the pin 22, with possible consequent damage and injury to personnel and equipment.

After the sub 14 and the wear sleeve 32 have thus been loosened from the tapered pin 22 of the drill collar body 12, the mounting tool 64 can be removed in the manner described above, to permit removal of members 14 and 32. A new replacement sub 14 and/or wear sleeve 32 can then be mounted in their place on the tapered pin 22 by shrink-fitting thereon, employing the mounting tool and hydraulic pressurizing equipment, in the manner described above and shown in FIG. 3.

Expansion pressures for mounting the subs 14 and 16 and the associated wear sleeve 32 when employed, to shrink-fit them on the tapered pins 22 and 24 and for removing these elements therefrom, as described above, can range from about 10,000 to about 14,000 p.s.i.

From the foregoing, it is seen that the threaded connections or subs, which are shrink-fitted onto the drill collar body, can be quickly and easily replaced in the field. The drill collar body remains at a constant length since it is unnecessary to rethread the usual pin and box connections on conventional drill collars, involving additional machining and working operations which reduce the overall length of the drill collar. It is merely necessary to substitute a new threaded connection or sub of the correct length for a worn one, all subs being of the same length. It is also possible to convert a conventional drill collar to the embodiment disclosed in the drawings by cutting a tapered pin 22 or 24 on one or both ends of the drill collar, thereby providing the body 12, and mounting a friction sub 14 or 16 at one or both ends of the drill collar body to provide the required overall length. The drill collar body does not require special heat treatment, the subs 14, 16 being made of better quality material, if desired, which can in addition be heat treated.

The shrink-fit connection between the threaded connection or sub and the drill collar body member provides a stronger friction joint than the threaded connected joints. Thus, the shrink-fitted joint, according to the invention, is capable of transmitting full torque and full axial loads in both directions greater than the load which normally is applied. The torque of the friction joint can be greater than the torque to which a threaded joint is subjected. Extra quality steel can also be used for the threaded connections or subs, which have greater resistance to wear, both against abrasion and threaded joint wear. As an example, a sub can be made of titanium steel having much higher yield strength than the drill collar body 12, the latter, for example, being made of AISI 4140 steel having a yield strength of 118,000 p.s.i.

We claim:

1. A drill collar for a rotary drill string, comprising a drill collar body member, a connection member at one end of said body member having a threaded end adapted for attachment to a companion threaded end of an adjacent portion of the rotary drill string, a first of said members including a pin portion having a conical outer surface, a second of said members including a box portion having a conical inner surface and adapted to receive said pin portion, said conical inner surface matching the configuration of said conical outer surface, one of said members having an external transverse shoulder near the base of the conical outer surface of said pin portion, the end of said box portion confronting said shoulder, a wear sleeve mounted on said pin portion between said shoulder and said end of said box portion, said wear sleeve being engageable by said shoulder and said end of said box portion, said sleeve having a conical inner surface corresponding to and in contact with said conical outer surface, means on one of said members for directing fluid under pressure to the region between said box portion inner surface and conical outer surface to expand said box portion, means on said sleeve for directing fluid under pressure to the region between said sleeve inner surface and conical outer surface to expand said sleeve, whereby expansion of said box portion and sleeve enables said pin portion to be moved relatively longitudinally along said box portion and sleeve to engage said end of said box portion with said sleeve and engage said sleeve with said shoulder to effect securing of said sleeve and box portion to said pin portion by shrink-fit frictional engagement between said sleeve and box portion inner surfaces and conical outer surface upon relieving of the fluid pressure in the regions between said sleeve and box portion inner surfaces and conical outer surface.

2. A drill collar as defined in claim 1; the angle of taper of said conical surfaces ranging from about ¼° to about 4°.

3. A drill collar as defined in claim 1; said first of said members being the body member, the second of said members being the connection member.

4. A drill collar as defined in claim 1; longitudinally spaced circumferential seals between and adjacent the end portions of said box portion conical inner surface and conical outer surface to retain the fluid under pressure in the region between said box portion conical inner surface and conical outer surface; longitudinally spaced circumferential seals between and adjacent the end portions of said wear sleeve inner surface and conical outer surface to retain the fluid under pressure in the region between said sleeve inner surface and conical outer surface.

5. A drill collar as defined in claim 4; said first of said members being the body member, the second of said members being the connection member.

6. A drill collar as defined in claim 1; said inner surfaces of said box portion and sleeve and outer surface being uninterrupted and conical throughout substantially their entire longitudinal extents to provide maximum areas of frictional contact between said inner surfaces and outer surface.

* * * * *

UNITED STATES PATENT OFFICE
CERTIFICATE OF CORRECTION

PATENT NO. : 3,923,324
DATED : December 2, 1975
INVENTOR(S) : JAMES R. CRUICKSHANK and RAINER JÜRGENS It is certified that error appears in the above-identified patent and that said Letters Patent are hereby corrected as shown below:

Column 2, line 53: cancel "and" (second occurrence).

Column 5, line 3: after "80" insert --to a--.

line 5: start new paragraph with "The piston 68".

Column 7, line 28: after "directions" insert --through the friction joint. The axial load thus withstood is far--.

Signed and Sealed this twenty-second Day of June 1976

[SEAL]

Attest:

RUTH C. MASON
Attesting Officer

C. MARSHALL DANN
Commissioner of Patents and Trademarks